United States Patent
Mahaney et al.

(10) Patent No.: US 8,186,186 B1
(45) Date of Patent: May 29, 2012

(54) LOCK ASSEMBLY

(75) Inventors: John C Mahaney, Spencer, MA (US); William E Johnson, Wrentham, MA (US)

(73) Assignee: Inner-Tite Corp., Holden, MA (US)

(*) Notice: Subject to any disclaimer, the term of this patent is extended or adjusted under 35 U.S.C. 154(b) by 0 days.

(21) Appl. No.: 12/976,074

(22) Filed: Dec. 22, 2010

(51) Int. Cl.
*E05B 73/00* (2006.01)

(52) U.S. Cl. .................. 70/14; 70/34; 70/177

(58) Field of Classification Search ............ 70/14, 34, 70/54–56, 212, 226, 233, 177, 179, 180
See application file for complete search history.

(56) References Cited

U.S. PATENT DOCUMENTS

| | | | | |
|---|---|---|---|---|
| 1,104,022 A * | 7/1914 | Tuttle | | 70/180 |
| 2,999,377 A * | 9/1961 | Raye | | 70/32 |
| 4,704,881 A * | 11/1987 | Sloop, Sr. | | 70/158 |
| 4,793,164 A * | 12/1988 | Sloop, Sr. | | 70/164 |
| 5,442,941 A * | 8/1995 | Kahonen et al. | | 70/34 |
| 5,987,939 A * | 11/1999 | Pitisettakarn | | 70/33 |
| 6,408,661 B1 * | 6/2002 | Chen | | 70/33 |
| 6,644,071 B2 * | 11/2003 | Gilbertson et al. | | 70/14 |
| 6,684,670 B1 * | 2/2004 | Agbay et al. | | 70/164 |
| 6,935,871 B2 * | 8/2005 | Maurer, Jr. | | 439/133 |
| 7,213,424 B2 * | 5/2007 | Dewalch | | 70/19 |
| 7,448,235 B2 * | 11/2008 | Ely et al. | | 70/2 |
| 7,650,767 B2 * | 1/2010 | Robinson | | 70/34 |
| 7,698,915 B2 * | 4/2010 | Wyers | | 70/33 |
| 2002/0092330 A1 * | 7/2002 | Hurst | | 70/14 |
| 2006/0236730 A1 * | 10/2006 | Wyers | | 70/14 |

* cited by examiner

*Primary Examiner* — Suzanne Barrett

(74) *Attorney, Agent, or Firm* — McCormick, Paulding & Huber LLP

(57) ABSTRACT

A lock assembly including a body portion having a bore configured to receive a lock. The assembly further includes a blade operably connected to the body portion and a head portion removably securable to the body portion. The head portion has a slot configured to receive the blade when assembled and the head portion also has a through bore to allow insertion of the lock such that the lock can lock the head portion and the body portion together during installation. The lock assembly may be used to secure multiple different lockable structures.

12 Claims, 4 Drawing Sheets

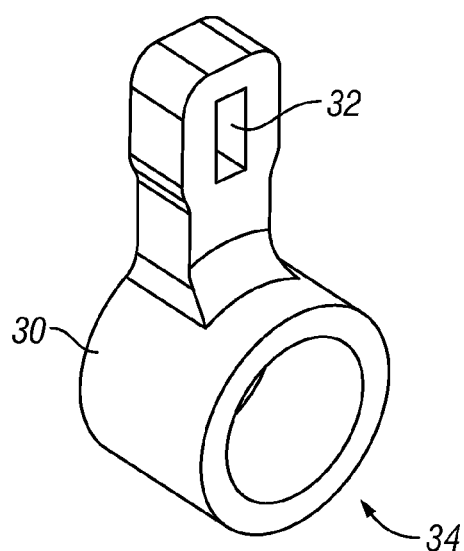
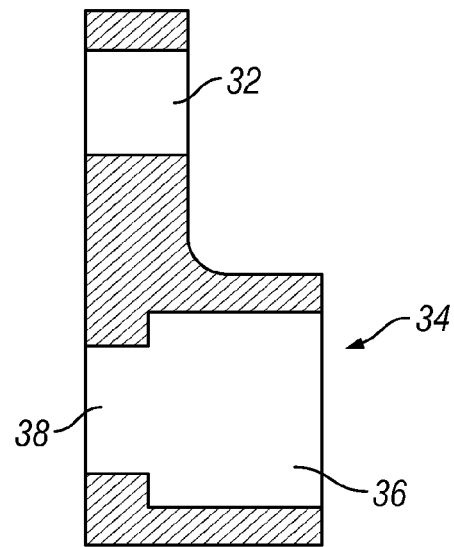
FIG. 4  FIG. 5
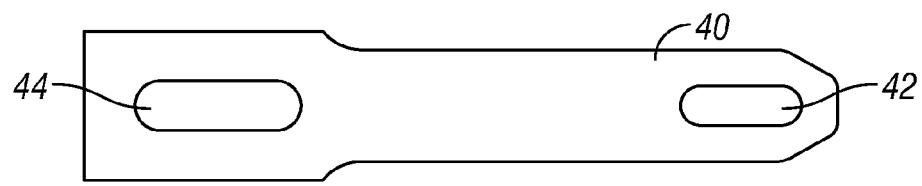
FIG. 6

LOCK ASSEMBLY

FIELD OF THE INVENTION

The present invention relates generally to a lock assembly and more particularly to a lock assembly that is preloadable and may be used to secure multiple different lockable structures.

BACKGROUND OF THE INVENTION

Consumption of electricity is typically monitored through the use of meters that are housed within meter boxes. Such meter boxes are usually locked to prevent access and tampering. In particular, meter boxes are often locked with "tab lock" locking mechanisms.

Moreover, utilities are generally provided to customers through lines that include valves, referred to as "stops" or "cocks." These valves include a body portion having an inlet and outlet that are separated by a rotatable plug. The plug has a handle or knob that may be rotated to control fluid flow. The valves are secured using a "pad lock" or "cock lock" locking mechanism.

While effective, the aforementioned locking mechanisms are not interchangeable. That is, a tab lock cannot be used to secure a valve and a cock lock cannot be used to lock a meter box. As will be appreciated, this necessitates the manufacture and deployment of two types of locking mechanisms for each application.

Moreover, existing tab locks are not preloadable and require assembly and the use of a key to install them. These limitations are not ideal as it is desirable to reduce the number of keys in the field to prevent loss and theft and to have a tab lock that does not require a key for assembly at the time of installation. Furthermore, it is desirable to have a tab lock that provides an ease of manufacture not presently available with known mechanisms.

SUMMARY OF THE INVENTION

It is an object of the present invention to provide a lock assembly.

It is an additional object of the present invention to provide a lock assembly that may be preloaded.

It is an additional object of the present invention to provide a lock assembly that may be used in a variety of applications.

It is an additional object of the present invention to provide a lock assembly that may be easily manufactured.

An embodiment of the present invention is a lock assembly including a body portion having a bore configured to receive a lock. The assembly further includes a blade operably connected to the body portion and a head portion removably securable to the body portion. The head portion has a slot configured to receive the blade when assembled and the head portion also has a through bore to allow insertion of the lock, such that the lock can lock the head portion and the body portion together during installation. The lock assembly may be used to secure multiple different lockable structures.

An additional embodiment of the present invention is a lock system for securing multiple different lockable structures. The system includes a substantially U-shaped body portion having a blade and a bore configured to receive a barrel lock. The system includes a head portion removably securable to the body portion. The head portion has a slot configured to receive the blade and a through bore to allow insertion of the barrel lock, such that, when assembled, the barrel lock can lock the head portion and the body portion together. The bore of said body portion includes an annular channel for partially receiving balls of the barrel lock to selectively hold the lock system in a pre-loaded condition such that a key is unnecessary for installation of the system.

Another embodiment of the invention is a method of securing a lockable structure. The method includes the steps of placing a body portion of a lock assembly in contact with a lockable structure. The method further includes aligning a head portion of the lock assembly with the body portion, the head portion being operatively connected to the body portion through a pre-loaded barrel lock. The barrel lock from a first preloaded position within the body portion to a second locked position within the body portion whereby the lock assembly secures the lockable structure.

BRIEF DESCRIPTION OF THE DRAWINGS

FIG. 4 is a perspective view of a head portion of the lock assembly of FIG. 1.

FIG. 5 is a sectioned side view of the head portion of FIG. 4.

FIG. 6 is a side view of a blade portion of the lock assembly of FIG. 1.

DETAILED DESCRIPTION OF THE INVENTION

Figure 1:
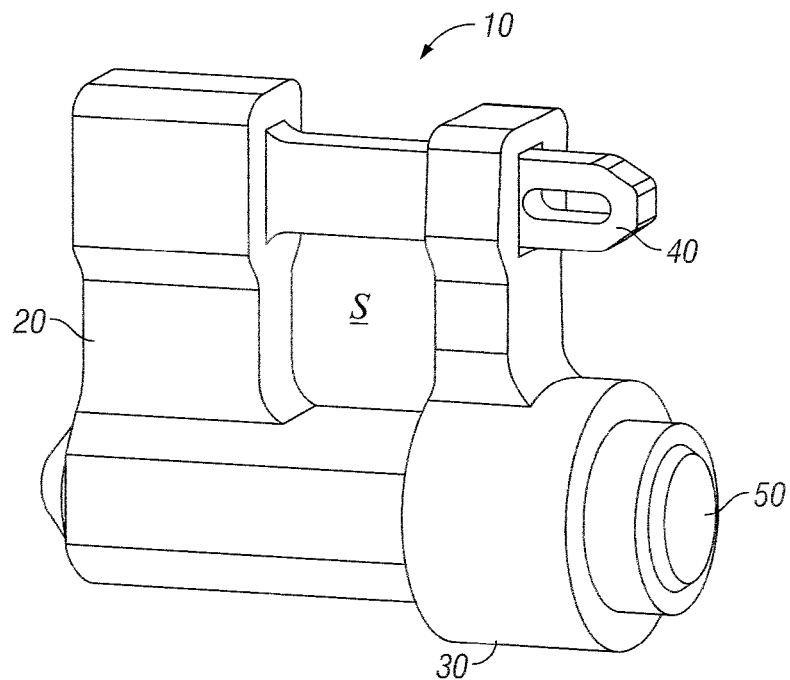
FIG. 1 is a perspective view of a lock assembly in accordance with an embodiment of the present invention.
Figure 2:
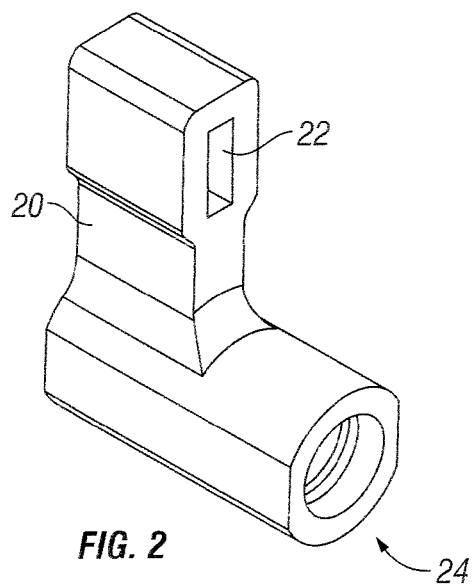
FIG. 2 is a perspective view of a body portion of the lock assembly of FIG. 1.
Figure 3:
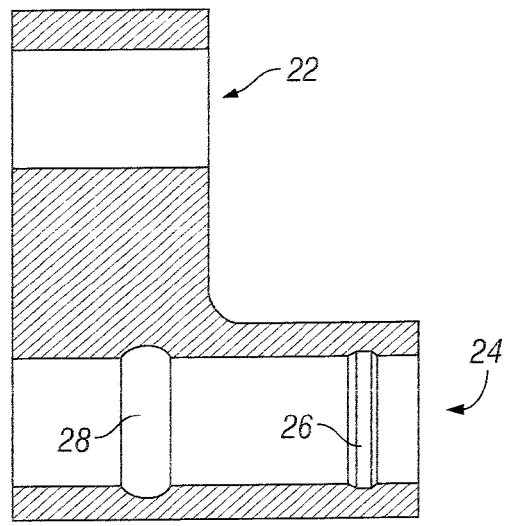
FIG. 3 is a sectioned side view of the body portion of FIG. 2.

Referring to FIGS. 1-6, an embodiment of the present invention includes a lock assembly 10 with a body portion 20, head portion 30 and blade 40. In use, the head portion is secured to body portion 20 and the blade 40 protruding from the body portion 20. A barrel lock 50 is then used to secure the head portion 30 and body portion 20 together. As will be appreciated, the inventive lock assembly 10 may be configured for use with various barrel locks such as, rotating disk and plunger type barrel locks, and, in particular, may be used with the barrel locks described in U.S. Pat. Nos. 5,086,631 and 7,775,071, which are hereby incorporated by reference in their entireties.

More specifically, in one embodiment, the body portion 20 is generally L-shaped and includes a slot 22 configured to receive and retain the blade 40. The blade 40 may be secured within the slot 22 through a variety of means. For example, the blade 40 may contain an attachment groove or slot 44 (FIG. 6) that could receive correspondingly shaped protrusions within the slot 22 (not shown) to fix the blade 40 in place. Alternatively, the blade 40 and body portion 20 can be unitary and formed from a single piece of material.

The body portion 20 further includes a cylindrical bore 24 for receiving the barrel lock 50. The bore 24 includes a recess 28 for the balls (not shown) of the barrel lock 50 allowing the barrel lock 50 to be secured within the body portion 20. The body portion 20 also includes an annular channel 26 that creates a circumferentially enlarged section of the bore 24.

The channel 26 receives the balls of the barrel lock 50 allowing the lock 50 to be "preloaded" within the bore 24 of the body portion 20.

In particular, the channel 26 is not as deep as the recess 28 and, as such, the balls of the lock 50 can only partially extend into the channel 26. As such, the channel 26 simply holds the barrel lock 50 within the body portion 20 to facilitate installation. In use, the barrel lock 50 is urged forward within the lock body by an installer which forces the balls out of the channel 26 and into the recess 28 to lock the barrel lock 50 and secure the inventive lock assembly.

As stated, an embodiment of the lock assembly 10 also includes a generally L-shaped head portion 30. The head portion 30 has a cylindrical through bore 34 that allows the barrel lock 50 to be inserted through the head portion 30 and into the body portion 20. The through bore 34 includes first section 36 and a second section 38 having a reduced diameter. The first section 36 receives the head of the barrel lock 50 which itself has a larger circumference than the portion of the lock 50 that extends into the bore 24 of the body portion 20. In particular, the first section 36 encapsulates the head of the barrel lock 50 to protect the lock head from attack. The second section 38 forms a "shoulder" portion, which prevents the passage of the barrel lock 50 through the through bore 34 and removal of the lock assembly. The second section 38 has a diameter that is substantially the same as the diameter of the bore 24

The head portion 30 also features a mounting slot 32. The mounting slot 32 is configured to receive the blade 40 of the body portion 20 when the inventive lock assembly 10 is assembled. More specifically, the blade 40 extends through the slot 32 allowing a sealing tab 70 to be placed on the blade 40 to provide a visual indicator of whether the assembly 10 has been tampered with. As shown in FIG. 6, the sealing tab 70 is placed through a tab slot 42 in the blade 40.

Figure 7:
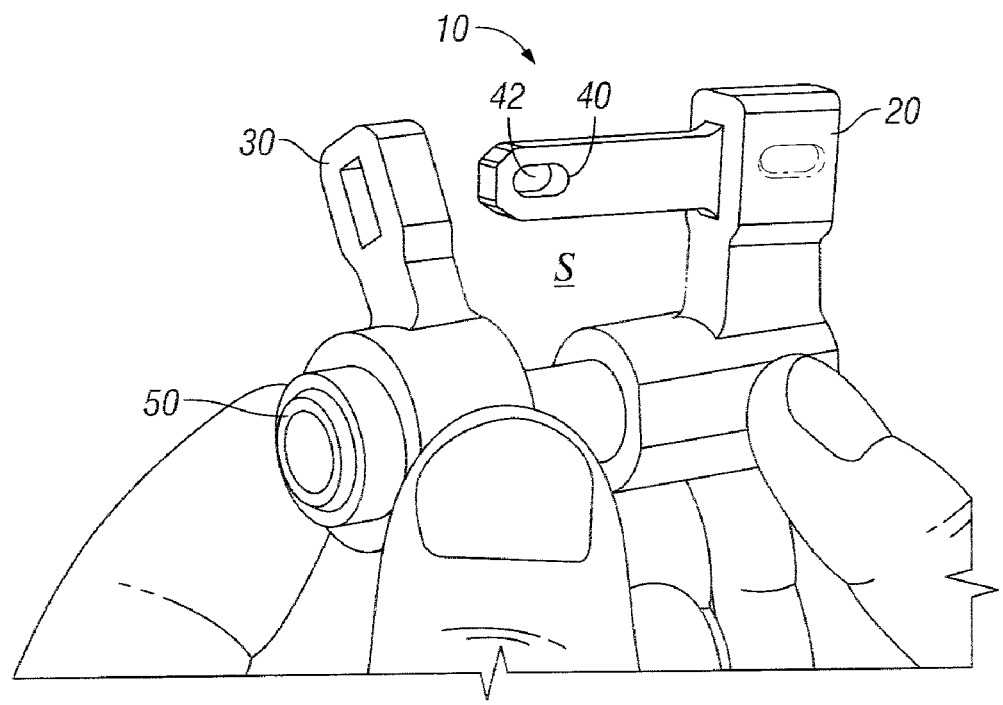
FIG. 7 is a perspective view of the lock assembly of FIG. 1 depicting the assembly is in a preloaded state.

Referring now to FIG. 7, the head portion 30 is rotatable relative to the body portion 20 when the lock assembly 10 is in a preloaded state, i.e., the barrel lock 50 is in the body portion 20 and its balls are located in annular channel 26. In this state, the body portion 20 may be placed into a locking position about, for example, a meter box tab, and then the head 30 may be rotated until the slot 32 is aligned with the blade 40. The barrel lock 50 and head portion 30 are then urged toward the body portion 20 causing the blade 40 to pass through the slot 32 and the balls of the lock 50 enter the recess 28 thereby locking the inventive lock assembly 10. A security seal may then be placed on the blade 40.

When assembled, the inventive lock assembly 10 forms a substantially quadrilateral shape with a relatively large central void or space S that is square or rectangular in shape. As will be appreciated, the space S may be made larger or smaller through the sizing of, among other things, the body portion 20 and head portion 30. The space S is configured such that it allows the inventive lock assembly to be employed in a variety of applications. This versatility is illustrated in FIGS. 8 and 9, which depict installation on a meter box tab and on a utility valve, respectively.

Figure 8:
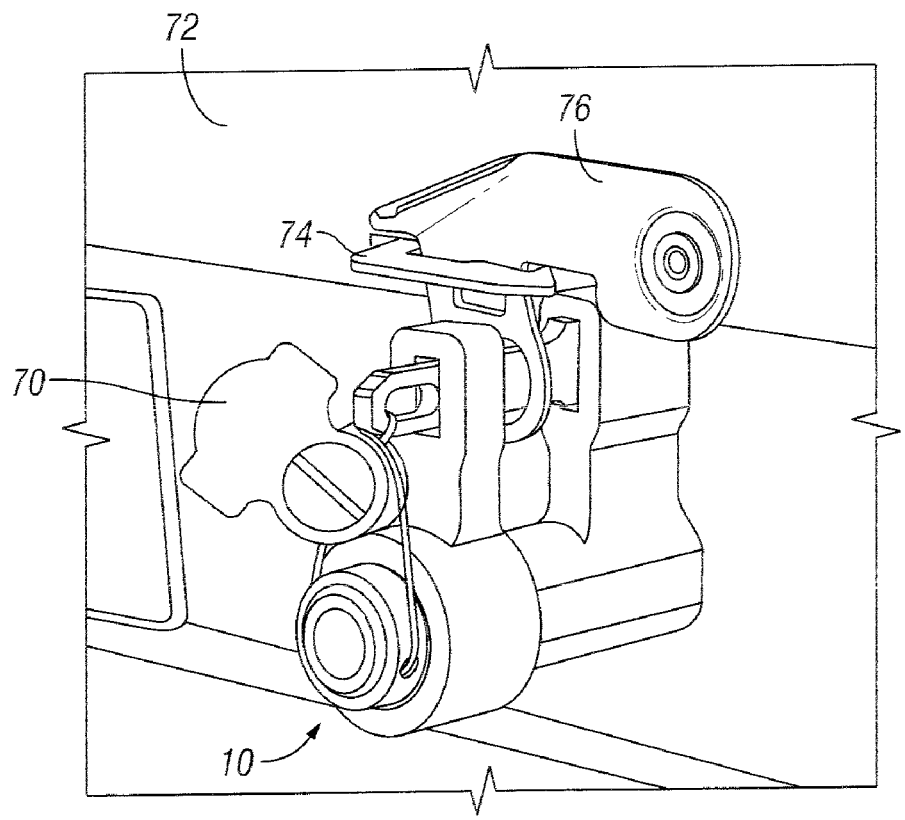
FIG. 8 is a perspective view of the lock assembly of FIG. 1 depicting the assembly mounted on a meter box.

In particular, FIG. 8 illustrates that the inventive lock assembly 10 can be installed on a meter box. In this specific installation, the meter box is closed such that a first tab 74 protrudes through the cover 72. A second tab 76 or closure is then rotated until a portion of it protrudes through an opening in the first tab preventing the cover 72 from being opened. The lock assembly 10 is then placed through a opening in the second tab 76 to prevent its rotation out of the opening in the first tab 74.

Figure 9:
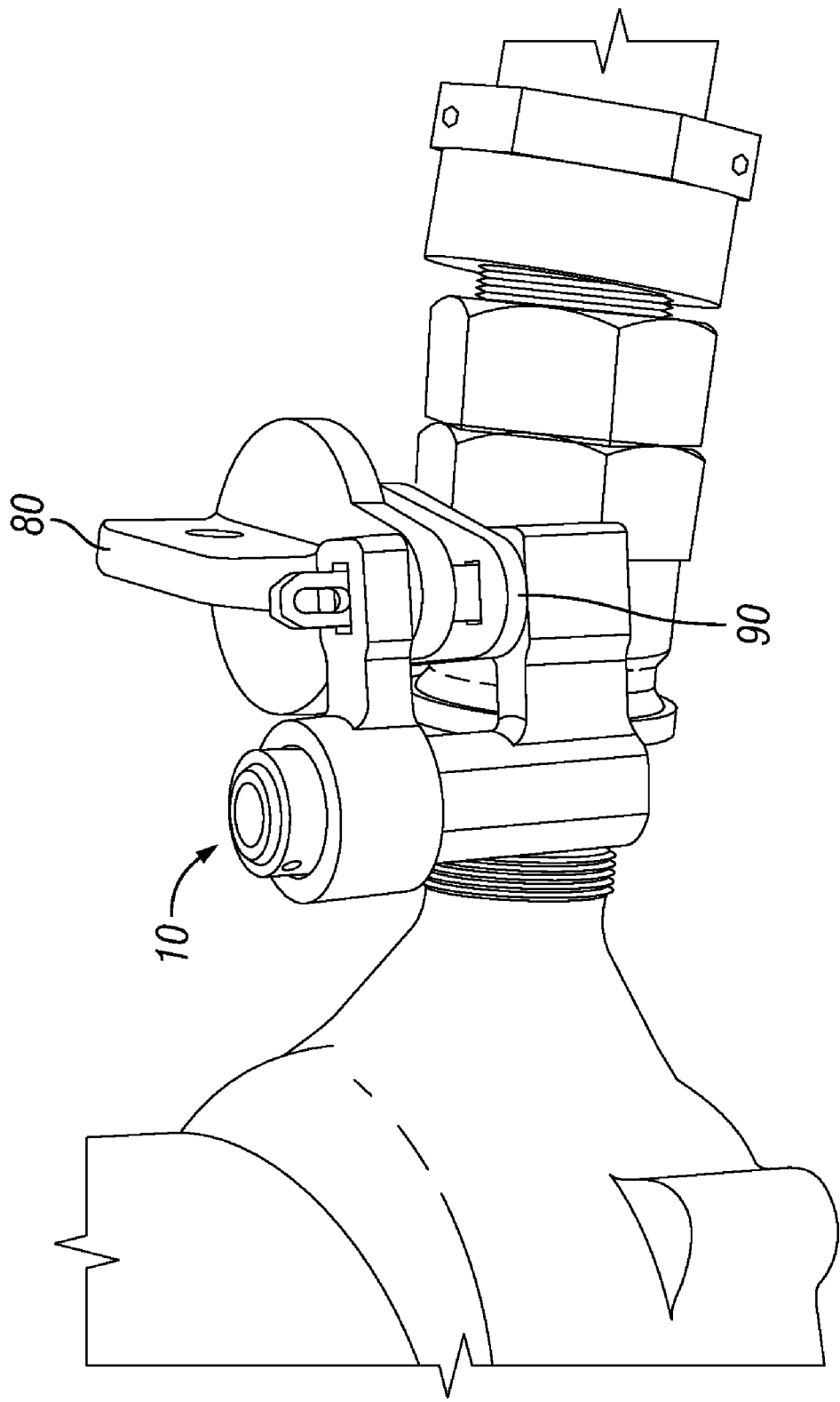
FIG. 9 is a perspective view of the lock assembly of FIG. 1 depicting the assembly mounted to a valve.

Turning now to FIG. 9, the inventive lock assembly 10 may also be used to secure a valve. This is facilitated, in part, by the space S. As shown, the lock assembly 10 is deployed by aligning an aperture in a valve body portion 90 with an aperture in a rotatable plug portion 80 having a handle or knob that may be rotated to control fluid flow. Once aligned, the blade 40 of the assembly 10 is then placed through the aligned apertures and the assembly 10 may be secured as described above.

In the embodiment described herein, the body portion and head portion may be manufactured from any suitable durable material, e.g., a hardened steel.

Furthermore, while the inventive assembly 10 has been described as being usable with meter boxes and valves, the assembly 10 may also be used for other applications like securing a chain, for example.

An embodiment of the present invention also contemplates a method of securing a lockable structure. The inventive method includes the steps of placing a body portion of a lock assembly in contact with a lockable structure. The method further includes aligning a head portion of the lock assembly with the body portion, the head portion being operatively connected to the body portion through a pre-loaded barrel lock. The barrel lock from a first preloaded position within the body portion to a second locked position within the body portion whereby the lock assembly secures the lockable structure.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," "third," "upper," "lower," "bottom," "top," "up," "down," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person skilled in the art to practice the embodiments of invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A lock assembly comprising:
    a body portion having a bore configured to receive a barrel lock;
    a blade operably connected to said body portion, said blade having an end portion having an aperture for attachment of a security tab;
    a head portion removably securable to said body portion, said head portion having a slot configured to receive said blade when assembled and said head portion having a through bore to allow insertion of said barrel lock such that said barrel lock can lock said head portion and said body portion together during installation; and
    wherein said lock assembly may be used to secure multiple different lockable structures;
    wherein said body portion is substantially L-shaped; and
    wherein said body portion and blade form a substantially U-shaped structure.

2. The lock assembly of claim 1, wherein said lock is a barrel lock.

3. The lock assembly of claim 1, wherein said bore of said body portion includes a recess for receiving balls of said lock to secure said lock assembly.

4. The lock assembly of claim 2, wherein said bore of said body portion includes an annular channel for partially receiving balls of said lock to selectively hold said lock assembly in a pre-loaded condition.

5. The lock assembly of claim 1, wherein said through bore of said head portion includes a reduced diameter shoulder portion to prevent passage of said lock completely through said through bore.

6. A lock assembly comprising:
    a body portion having a bore configured to receive a barrel lock;
    a blade operably connected to said body portion, said blade having an end portion having an aperture for attachment of a security tab;
    a head portion removably securable to said body portion, said head portion having a slot configured to receive said blade when assembled and said head portion having a through bore to allow insertion of said barrel lock such that said barrel lock can lock said head portion and said body portion together during installation; and
    wherein said lock assembly may be used to secure multiple different lockable structures;
    wherein said head portion is substantially L-shaped; and
    wherein said body portion and blade form a substantially U-shaped structure.

7. A lock assembly comprising:
    a body portion having a bore configured to receive a barrel lock;
    a blade operably connected to said body portion, said blade having an end portion having an aperture for attachment of a security tab;
    a head portion removably securable to said body portion, said head portion having a slot configured to receive said blade when assembled and said head portion having a through bore to allow insertion of said barrel lock such that said barrel lock can lock said head portion and said body portion together during installation; and
    wherein said lock assembly may be used to secure multiple different lockable structures;
    wherein said body portion and blade form a substantially U-shaped structure; and
    wherein said assembly, when assembled, has a substantially rectangular inner void, said inner void facilitating the attachment of said assembly to multiple different lockable structures.

8. A lock system for securing multiple different lockable structures including a meter box and a utility valve, said system comprising:
    a substantially U-shaped body portion having a blade and a bore configured to receive a barrel lock;
    a head portion removably securable to said body portion, said head portion having a slot configured to receive said blade and a through bore to allow insertion of said barrel lock, such that, when assembled, said barrel lock can lock said head portion and said body portion together; and
    wherein said bore of said body portion includes an annular channel for partially receiving balls of said barrel lock to selectively hold said lock system in a pre-loaded condition such that a key is unnecessary for installation of said system; and
    wherein said system, when assembled, forms a substantially rectangular inner void, said inner void facilitating the attachment of said system to multiple different lockable structures.

9. The lock system of claim 8, wherein said bore of said body portion further includes an annular recess for receiving balls of said barrel lock to secure said lock system to a lockable structure.

10. The lock system of claim 8, wherein said through bore of said head portion includes a reduced diameter shoulder portion to prevent passage of said lock completely through said through bore.

11. The lock system of claim 8, wherein said blade has an end portion having an aperture for attachment of a security tab.

12. A lock system for securing multiple different lockable structures including a meter box and a utility valve, said system comprising:
    a substantially U-shaped body portion having a blade and a bore configured to receive a barrel lock;
    a head portion removably securable to said body portion, said head portion having a slot configured to receive said blade and a through bore to allow insertion of said barrel lock, such that, when assembled, said barrel lock can lock said head portion and said body portion together; and
    wherein said bore of said body portion includes an annular channel for partially receiving balls of said barrel lock to selectively hold said lock system in a pre-loaded condition such that a key is unnecessary for installation of said system; and
    wherein said head portion is substantially L-shaped.

* * * * *